United States Patent [19]

Minaudo

[11] Patent Number: 4,948,354
[45] Date of Patent: Aug. 14, 1990

[54] EXTRUSION HEAD FOR PRODUCING SHEET MATERIAL REINFORCED INTERNALLY WITH CLOSE-PACKED CORDS

[75] Inventor: Diego Minaudo, Rome, Italy
[73] Assignee: Bridgestone/Firestone, Inc., Akron, Ohio
[21] Appl. No.: 338,670
[22] Filed: Apr. 17, 1989
[30] Foreign Application Priority Data Apr. 27, 1988 [IT] Italy ............................... 67386 A/88

[51] Int. Cl.⁵ ............................................. B29C 47/02
[52] U.S. Cl. ................................. 425/114; 425/376.1; 425/467; 425/818
[58] Field of Search ................. 264/174, 103; 156/436, 156/441; 425/113, 114, 376.1, 380, 382.4, 462, 467, 818, DIG. 108

[56] References Cited

U.S. PATENT DOCUMENTS

| | | | |
|---|---|---|---|
| 1,603,812 | 10/1926 | Stein | 264/171 |
| 1,727,090 | 9/1929 | Alderfer | 156/441 |
| 2,061,749 | 11/1936 | Beal | 264/174 |
| 3,403,422 | 10/1968 | Nakagawa et al. | 264/171 |
| 3,553,069 | 1/1971 | Rasmussen | 264/171 |
| 3,567,545 | 3/1971 | Bobkowicz et al. | 264/103 |
| 4,274,821 | 6/1981 | Kiemer | 425/114 |

Primary Examiner—James C. Housel
Attorney, Agent, or Firm—Ernst H. Ruf

[57] ABSTRACT

An extrusion head 1 for producing sheet material 2, particularly elastomeric material, reinforced internally with relatively close-packed metal or textile cords 3; on which a die adapter 8 houses a "mandrel" 23 aligned with an output die 16 for the extruded sheet material 2 and having an axial slot 31 for feeding the reinforcing cords 3 to the die 16; the aforementioned mandrel 23 having, on its front end facing the die 16, an insert 32 defining, together with the die adapter 8, an upper channel 34 and a lower channel 35 for supplying plastic material; which insert 32 consists of an upper element 40 and a lower element 41, the front ends of which are arranged contacting so as to define a cord output guide member 56, and the rear ends of which are gripped together with the interposition of an intermediate element 47, so as to define two superimposed cord input guide members 61, 62 converging inside the output guide member 56, having a cord density equal to half that of the output guide member 56, and offset by half the space between two adjacent cords in relation to each other.

7 Claims, 3 Drawing Sheets

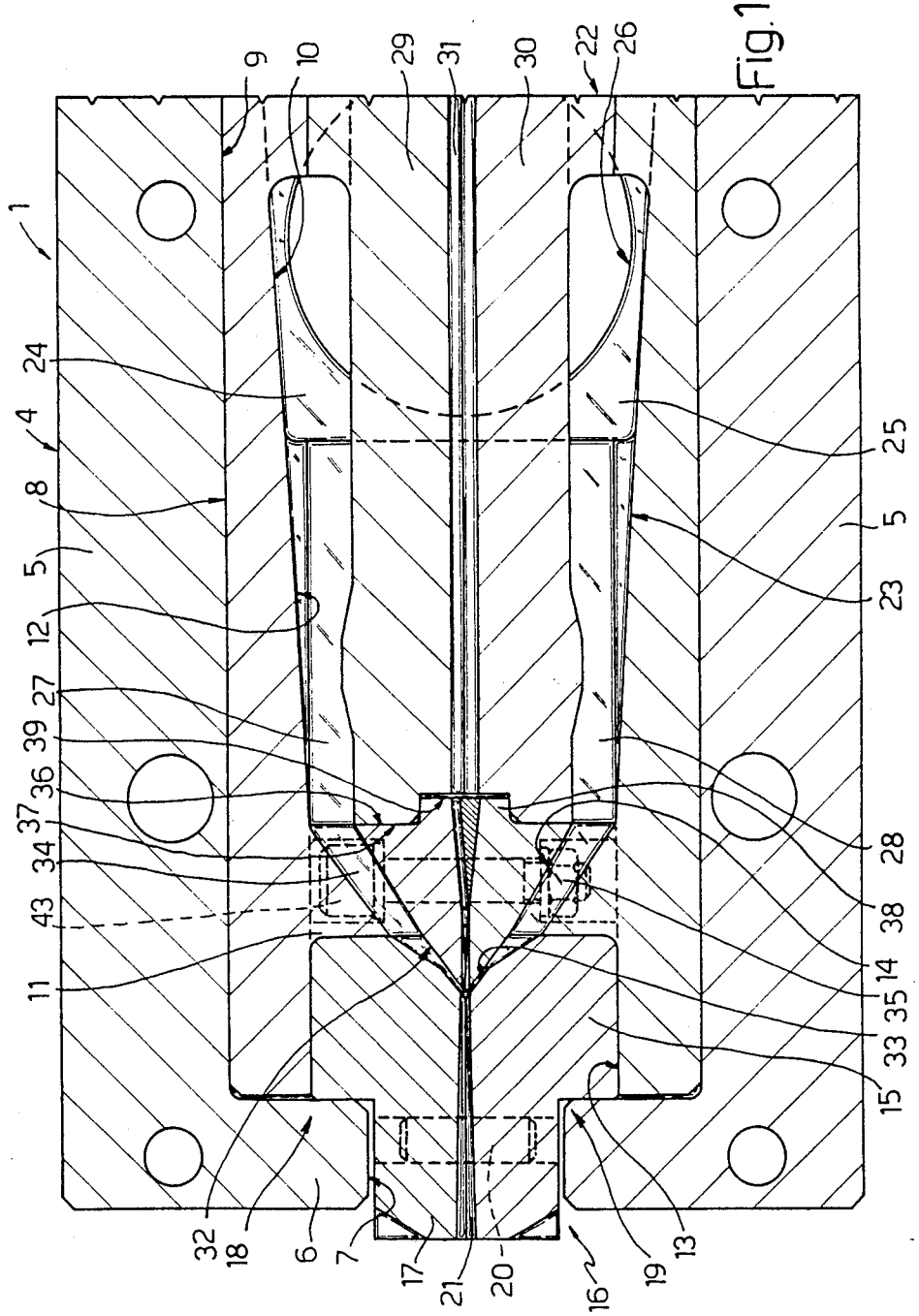

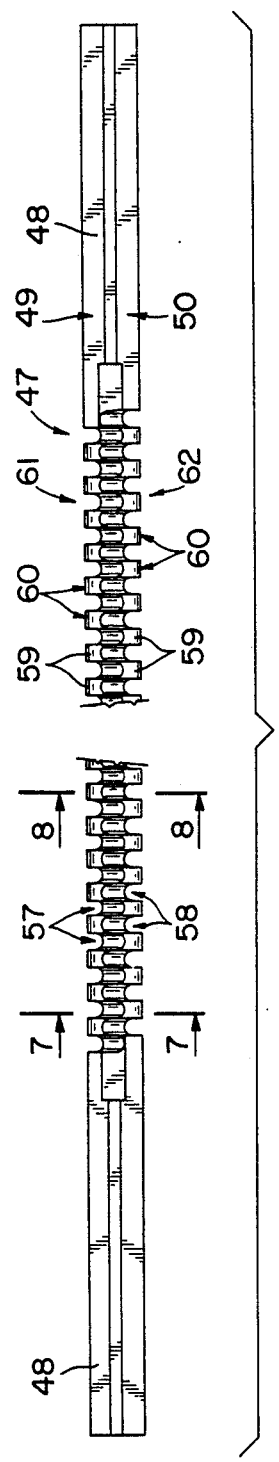
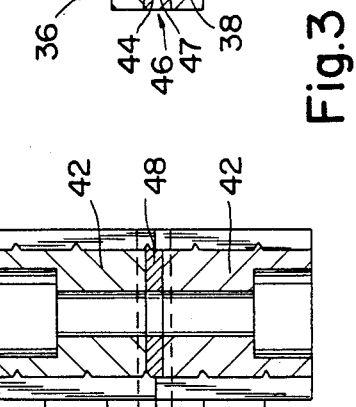
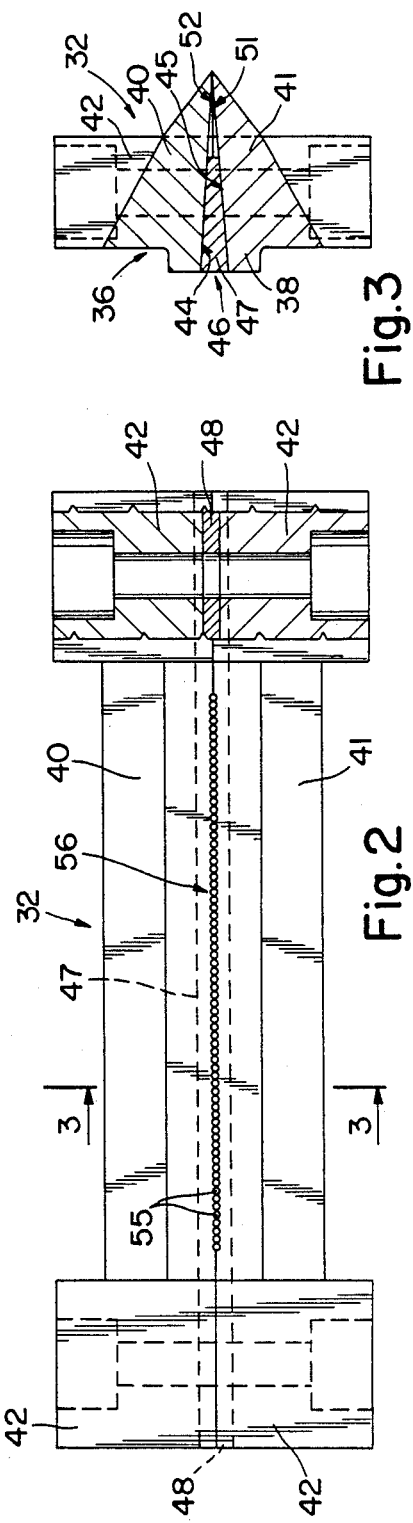

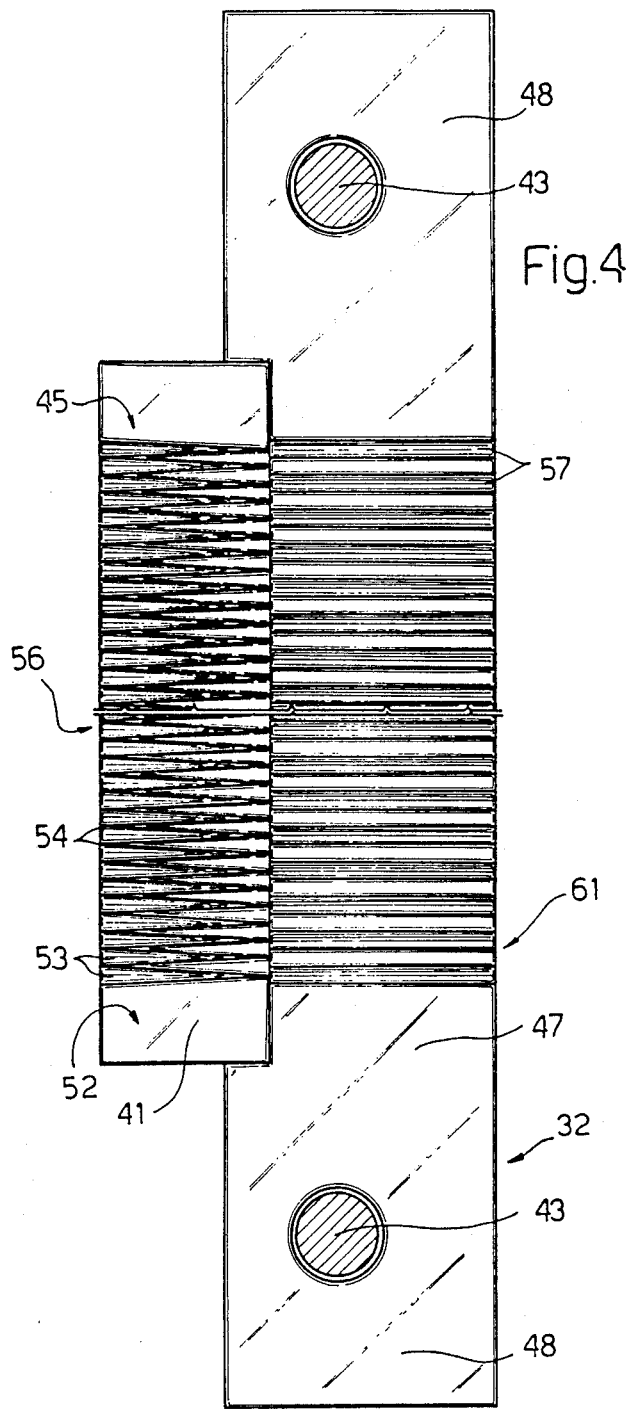
Fig. 4
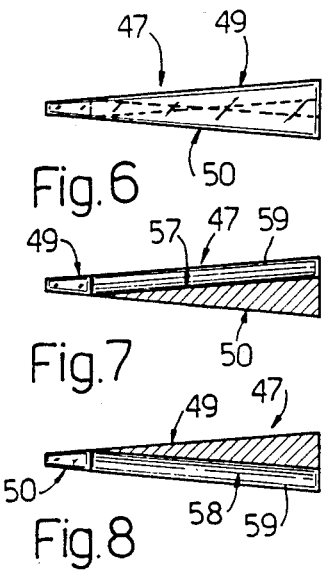
Fig. 6
Fig. 7
Fig. 8
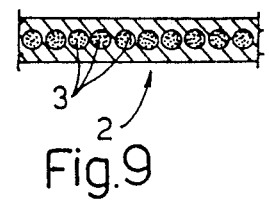
Fig. 9

4,948,354

EXTRUSION HEAD FOR PRODUCING SHEET MATERIAL REINFORCED INTERNALLY WITH CLOSE-PACKED CORDS

TECHNICAL FIELD

The present invention relates to an extrusion head for producing sheet material reinforced internally with relatively -packed cords. In particular, the present invention relates to an extrusion head for producing plies of elastomeric material reinforced internally with "high-density" metal or textile cords, i.e. lying in the same plane and packed closely together with an average cord spacing of approximately 0.1 mm.

BACKGROUND OF THE ART

Reinforced plies are normally produced using extruders having an extrusion head comprising a die adapter inside which is housed a mandrel aligned with the output die and having an axial duct for supplying the reinforcing cords to the die. The front end of the mandrel facing the die usually presents an insert through which the cords are fed, and defining, together with the die adapter, an upper and lower channel by which the die is fed with plastic elastomeric material for forming two layers of elastomeric sheet material arranged on either side of an intermediate cord layer, and joined together along the caps between adjacent cords.

The insert usually consists of an upper and lower element gripped together in a contacting manner and defines a cord guide member for maintaining constant cord distribution as the cords are fed through the die and subjected to the lateral thrust of the plastic material supplied to the die along the said supply channels. On known extrusion heads of the aforementioned type, the upper and lower elements of the said insert present respective flat lateral surfaces gripped together in contacting manner and each having a series of grooves mating with corresponding grooves on the other surface so as to define respective cord guide holes.

Being located between the said two supply channels, the upper and lower elements of the said insert are therefore subjected to severe pressure, by which the said elements are compressed one against the other. Severe contact pressure is thus exerted on the contact surfaces of the said upper and lower elements, i.e., on the flat strip portions of the said contacting surfaces extending between each pair of adjacent grooves.

Obviously, therefore, for cord densities over and above a given value, the width of the said flat strips is so small s to produce specific contact pressures in excess of the yield point of the metal from which the insert is formed, thus collapsing the diaphragms between adjacent grooves on each element, and jamming the cord inside the guide member. On account of the above drawback, extrusion heads of the aforementioned type cannot be employed for cord densities involving strips of less than approximately 0.5 mm in width.

DISCLOSURE OF THE INVENTION

The aim of the present invention is to provide an extrusion head of the aforementioned type enabling the production of reinforced plies having a "high cord density". With this aim in view, according to the present invention, there is provided an extrusion head for producing sheet material, particularly elastomeric material, reinforced internally with relatively close-packed cords; said extrusion head comprising a die for the internally reinforced sheet material, and a cord guide insert comprising a first and second element arranged contacting and one on top of the other; characterized by the fact that the insert also comprises an intermediate element between the first and second elements and defining, with the same, an output guide member facing the die and having a number of holes arranged in a row, and two input guide members arranged one on top of the other and converging inside the output guide member; each of the input guide members having a cord density equal to half that of the output guide member, and being offset by half the cord spacing in relation to each other.

A non-limiting embodiment of the present invention will now be described by way of example with reference to the accompanying drawings.

BRIEF DESCRIPTION OF THE DRAWINGS

FIG. 1 shows an axial section of a preferred embodiment of the extrusion head according to the present invention;

FIG. 2 shows a front view of a detail in FIG. 1;

FIG. 3 shows a section along line 3—3 in FIG. 2;

FIG. 4 shows a plan view of the FIG. 2 detail with parts removed for simplicity;

FIG. 5 shows a front view of a detail in FIG. 2;

FIG. 6 shows a lateral end view of the FIG. 5 detail;

FIG. 7 shows a section along line 7—7 in FIG. 5;

FIG. 8 shows a section along line 8—8 in FIG.5; and

FIG. 9 shows a cross section of a reinforced ply formed using the extrusion head in FIG. 1.

BEST MODE FOR CARRYING OUT THE INVENTION

Number 1 in FIG. 1 indicates an extrusion head for producing an elastomeric ply 2 (FIG. 9) reinforced internally with "high-density" metal or textile cords 3, i.e., arranged side by side in the same plane and approximately 0.1 of a millimeter apart.

Head 1 comprises an outer casing 4 having longitudinal side walls 5 and a front end wall 6 with a substantially rectangular axial through hole or aperture 7. Head 1 also comprises a die adapter 8 housed inside a cavity 9, defined by walls 5, the front of which is arranged so as to contact the inner surface of wall 6. Die adapter 8 presents an inner axial channel 10 divided into two parts by an inner transverse partition 11. A first of these parts, located at the rear, consists of a substantially rectangular-section hole 12 tapering towards partition 11, whereas the second of these parts consists of a substantially rectangular-section hole 13, coaxial with hole 7, the rear end of which communicates with the front end of hole 12 via a substantially rectangular-section on hole 14 formed through partition 11 and tapering towards hole 13 commencing from the tapered front end of hole 12.

Hole 13 houses a parallelpiped body 15 of a die 16 locked axially between partition 11 and wall 6, and comprises a front, substantially rectangular-section appendix 17 extending outwards of casing 4 through hole 7. Die 16 is defined by a top die 18 and bottom die 19 connected by through pins 20 and defining a transverse slot 21 coaxial with hole 7, through which ply 2 is extruded.

Hole 12 houses the rear body 22 of a cord guide member 23, hereinafter referred to as a "mandrel", with body 22 presenting a substantially rectangular section tapering towards partition 11, the rear portion of which presents a top and bottom transverse groove, 24 and 25, which constitutes a manifold for plastic elastomeric material fed into casing 4 and die adapter 8 through a lateral input hole 26. The front portion of body 22 presents a top and bottom axial supply channel, 27 and 28, the respective rear ends of which communicate respectively with grooves 24 and 25. Body 22 consists of a top and bottom plate, 29 and 30, defining a slot 31 through which cords 3 are supplied to die 16.

In addition to rear body 22, mandrel 23 also comprises a transverse, substantially triangular section insert 32 engaging tapered hole 14, the pointed front end portion of which extends inside a transverse groove 33 formed on the rear surface of body 15 of die 16. On the top and bottom surfaces of hole 14, are formed two grooves defining, together with the top and bottom surfaces of insert 32, two tapered, converging channels, 34 and 35, communicating respectively with channels 27 and 28, and designed to supply plastic elastomeric material to slot 21 of die 16. Insert 32 is defined rearwards by a flat surface 36 contacting a flat front surface 37 of body 22 and having an appendix 38 engaging a transverse groove 39 formed on surface 37.

As shown particularly in FIGS. 2 and 3, insert 32 consists of a wedge-shaped top and bottom element, 40 and 41, each of which presents, on its opposite lateral ends, two blocks 42 in the form of a rectangular parallelepipedon, that are connected to block 42 on the other element of insert 32 by means of a through bolt 43.

Elements 40 and 41 are defined by respective inclined surfaces 44 and 45, the front ends of which are arranged contacting along a line lying in the axial plane of head 1 along which extend slots 21 and 31. Commencing from the front ends, the said two surfaces 44 and 45 diverge to define a dihedral 46, the rear portion of which is occupied by a wedge-shaped intermediate element 47 having, on its opposite ends, two plates 48 fitted through with bolts 43 and gripped between two respective blocks 42.

As shown, particularly in FIGS. 5 to 8, intermediate element 47 is defined at the top and bottom by two inclined, converging surfaces, 49 and 50, contacting surfaces 44 and 45 respectively. Contact between surfaces 44 and 49 and surfaces 45 and 50 is limited to the rear portion of surfaces 44 and 45, the front portions 51 and 52 of the same being exposed and facing each other directly.

As shown in FIG. 4, front portions 51 and 52 (of which only portion 52 is shown) present grooves 53 coplanar with slots 21 and 31. Grooves 53, the width of which obviously decreases commencing from the front end, are separated by ridges 54 having a minimum width of approximately 0.1 mm at the front end and increasing gradually towards the front end of intermediate element 47. Each groove 53 on portion 51 mates with a corresponding groove 53 on portion 52 to define a hole 55 (FIG.2) on a cord output guide member 56 defined between front portions 51 and 52.

The rear portions of surfaces 44 and 45 are flat, whereas surfaces 49 and 50 respectively contacting same present or show, as shown in FIGS. 4 and 5, respective sets of grooves 57 and 58, each of which grooves is aligned with and presents substantially the same section as a respective hole 55. Grooves 57 and 58 are equally spaced with twice the spacing, of holes 55, and are offset by half a space, in relation to one another, so as to be aligned with respective alternate holes 55. Each groove 57 and 58 is separated from the adjacent grooves 57, 58 by a ridge 59 defined by a flat strip 60 forming part of respective surface 49, 50 and at least equal in width to the diameter of grooves 57 and 58.

Together with opposite surfaces 44 and 45, grooves 57 and 58 define two superimposed input guide members, 61 and 62, both converging inside output guide member 56, and each having a guide hole density equal to half that of output guide member 56, and communicating rearwards with slot 31.

In actual use, cords 3 are first threaded through slot 31 so that, of each pair of cords 3, one engages a groove 57 on input guide member 61, and the other a groove 58 on input guide member 62. Each cord 3 is then threaded through a respective hole 55 on output guide member 56, at which point, extrusion of ply 2 may be commenced in a known manner.

Intermediate element 47 thus provides for considerably extending the contact surfaces inside insert 32, and so reducing specific contact pressure to acceptable limits, even when extruding "high-cord-density' plies 2. In the case of such plies, the said contact surfaces are formed, not by approximately 0.1 mm wide strips as on the inserts of known extrusion heads, but by strips, such as strips 60 and 61, at least equal in width to the diameter of cords 3.

From the foregoing description and the operational discussion, when read in light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

What is claimed is:

1. An extrusion head for producing sheet material reinforced internally with close-packed cords; said extrusion head comprising a die for said internally-reinforced sheet material, and a cord guide insert comprising a first and second element arrangement contacting and one on top of the other; wherein said cord guide insert also comprises an intermediate element between said first and second elements, said elements together defining a cord output facing said die and having a plurality of output holes arranged in a row, and two cord inputs arranged one on top of the other each having a plurality of input holes arranged in a row, first channels connecting first alternating ones of said output holes with the input holes of one row, and second channels connecting second alternating ones of said output holes with the input holes of the other row, said first and second channels converging inside said cord guide insert for guiding said cords from said two input rows of holes to said output row of holes.

2. An extrusion head as claimed in claim 1, wherein said first and second elements present respective front portions facing said die in direct contact together so as to define said output, and respective rear portions gripped together with the interposition of said intermediate element so as to define said two inputs.

3. An extrusion head as claimed in claim 2, wherein said intermediate element is defined at top and bottom by two inclined, converging flat surfaces respectively contacting the rear portion of respective inner surfaces of said first and second elements; said inner surfaces comprising respective front portions directly facing and contacting each other.

4. An extrusion head as claimed in claim 3, wherein each front portion of each inner surface presents a plurality of grooves each mating with a corresponding groove on the other front portion so as to define a respective hole on said output; said grooves being separated by ridges of minimum width and maximum depth at the output increasing gradually in width and decreasing gradually in depth towards said intermediate element.

5. An extrusion head as claimed in claim 3 or 4, , wherein the rear portions of the inner surfaces of said first and second elements, are flat, whereas the surfaces of said intermediate element respectively contacting the rear portions of said first and second elements present respective sets of grooves defining a portion of said first and second channels; each groove on said intermediate element having substantially the same transverse cross-section as a respective said hole on the output.

6. An extrusion head as claimed in claim 5 wherein said grooves of each set on said intermediate element are equally spaced with twice the spacing of the holes in the row of said output, and said offset by half the groove spacing in relation to the grooves of the other set, so as to be aligned with respective alternate holes of said output.

7. An extrusion head as claimed in claim 6, wherein adjacent grooves on said intermediate element are separated by a ridge at least equal in width to the diameter of the groove.

* * * * *